(12) United States Patent
Kaneshige

(10) Patent No.: US 6,987,340 B2
(45) Date of Patent: Jan. 17, 2006

(54) DC MOTOR WITH BRUSHES

(75) Inventor: Susumu Kaneshige, Aichi-ken (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 207 days.

(21) Appl. No.: 10/743,907

(22) Filed: Dec. 24, 2003

(65) Prior Publication Data

US 2004/0135455 A1    Jul. 15, 2004

(30) Foreign Application Priority Data

Dec. 26, 2002  (JP) .............................. 2002-378643

(51) Int. Cl.
  H02K 1/17    (2006.01)
  H02K 23/40   (2006.01)
(52) U.S. Cl. ........................ 310/154.28; 310/154.21; 310/154.22
(58) Field of Classification Search ........... 310/154.21, 310/154.22, 154.27–154.29
  See application file for complete search history.

(56) References Cited

U.S. PATENT DOCUMENTS

| | | | |
|---|---|---|---|
| 4,438,362 A * | 3/1984 | Brown ........................ 310/152 |
| 6,342,744 B1 * | 1/2002 | Harada et al. ......... 310/154.12 |
| 6,580,237 B2 * | 6/2003 | Harada et al. ............... 318/254 |
| 6,628,030 B2 * | 9/2003 | Harada et al. ......... 310/154.29 |
| 6,720,697 B2 * | 4/2004 | Harada et al. ......... 310/154.28 |
| 6,870,290 B2 * | 3/2005 | Harada et al. ......... 310/154.29 |
| 6,927,518 B2 * | 8/2005 | Tanaka et al. ......... 310/154.06 |
| 2004/0135455 A1 * | 7/2004 | Kaneshige ............. 310/156.46 |

FOREIGN PATENT DOCUMENTS

| JP | 5759465 | 4/1982 |
|---|---|---|
| JP | 57197779 | 12/1982 |
| JP | 2003189574 | * 7/2003 |
| JP | 2003250255 | * 9/2003 |

* cited by examiner

*Primary Examiner*—Karl Tamai
(74) *Attorney, Agent, or Firm*—Dennison, Schultz, Dougherty & MacDonald

(57) ABSTRACT

A DC motor includes a stator of magnets surrounding a rotor containing coils of wire surrounding cores. Brushes serve to repeatedly start and interrupt the supply of current to the individual coils via respective commutator segments of the rotor in order to rotate the rotor. Each pole includes a reduced magnetic flux density area and an increased magnetic flux density area. The potential discharge between the commutator segments and the brushes supplying current to the individual coils is reduced by altering the magnetic forces of the poles within the reduced magnetic flux density area and the increased magnetic flux density area. The magnetic forces of the poles are altered by using either separate magnets of varying levels of strength or by altering the gap between the cores and the poles.

21 Claims, 6 Drawing Sheets

DC MOTOR WITH BRUSHES

This application claims priority to Japanese patent application Ser. No. 2002-378643, the contents of which are incorporated herein by reference.

BACKGROUND OF THE INVENTION

1. Technical Field

The present invention relates to DC (direct current) motors having brushes for supplying power to the DC motors.

2. Description of the Related Art

Up to now, DC motors having brushes have been used for various machines and apparatus, e.g., vehicles, because the DC motors have a relatively high efficiency and can be easily controlled.

FIG. 4(A) schematically illustrates a known DC motor that has been formed by using a concentrated winding method. The known DC motor is configured as a four-pole and six-slot type of DC motor that has four permanent magnets and six slots, i.e., six coils (delta connection type) and six cores around which the coils are wound. Each of the permanent magnets has an N-pole surface and an S-pole surface. The terminals of each coil are connected to two corresponding commutator segments. In general, the number of coils is set to be larger than the number of poles (permanent magnets) in order to help minimize dead points during rotation of the armature.

More specifically, in the known DC motor shown in FIG. 4(A), permanent magnets M1–M4 are fixed to an inner wall of a yoke in order to constitute a stator. The quantity of individual permanent magnets is chosen to be even in number. For example, in the known DC motor four poles (permanent magnets) M1 to M4 are arranged in a circle to substantially form a cylinder. The polarity of the surface of each of the poles M1–M4, on the side facing the rotor, alternates from magnet to adjoining magnet. Thus, the polarity of a surface directly opposing the rotor of the magnet M1 is N, and the polarity of same surfaces of the permanent magnets M2 and M4, both of which adjoin permanent magnet M1, is S.

The rotor includes cores T1–T6 with slots R1–R6 formed therebetween. Coils C1–C6 are wound around the corresponding cores T1–T6 via the corresponding slots. Commutator segments S1–S6 are connected to the terminals of the corresponding coils. The commutator segments S1–S6 are electrically insulated from each other. The rotor rotates about the center axis that defines the stator. The rotor rotates within the stator.

Brushes B1–B4 are disposed and are arranged such that the individual commutator segments S1–S6 form an electrical connection with various individual brushes B1–B4 when the commutator segments S1–S6 rotate through a predetermined angle. The number of the brushes B1–B4 is the same or smaller than the number of the poles (permanent magnets) in the configuration shown in FIG. 4(A), the number of the brushes (four) is equal to the number of the poles. A power source E is connected to each of the brushes B1 to B4 via a positive or negative terminal, so that the brushes supply current to the coils via the commutator segments that contact the brushes.

FIG. 4(B) illustrates an example of positional relations between the brushes B1–B4 of the DC motor shown in FIG. 4(A). In this example, the brushes B1 and B3 each extend approximately 20° around the center axis of the armature. Brush B1 begins from approximately a 25° position and extends in a counterclockwise direction (assuming the horizontal axis to the right of the rotor to be a 0° reference position). Brush B3 begins approximately 25° below a 180° reference position (205° from the 0° reference of B1) as shown in FIG. 4(B). Thus, each of the brushes B1 and B3 extends from an initial position indicated by DegB1s to a final position indicated by DegB1e. Similarly, the brushes B2 and B4 extend over a range of 20° from positions rotated 25° counterclockwise respectively from a 90° reference and 270° reference positions (105° and 295° from the 0° reference of B1) as shown in FIG. 4(B). Thus, each of the brushes B2 and B4 extends from an initial position indicated by DegB2s to a final position indicated by DegB2e.

In the case of the DC motor shown in FIGS. 4(A) and 4(B), the rotor is rotated in the counterclockwise direction. The current is supplied to the coil C1 during the time when the boundary element between the commentator segments S1 and S2 is not within the 20° range corresponding to the contact area of any of the four brushes B1–B4. Thus, during each rotation of the rotor, the coil C1 has four separate current supply periods. The supply periods correspond to when the S1 and S2 boundary element is rotated within the range established between DegB1e and DegB2s and the range established between DegB2e and DegB1s. The same general principle also applies to the other coils C2–C6.

Next, the magnetic flux density around each coil during one current supply period will be described with reference to FIGS. 5(A) and 5(B).

FIG. 5(A) illustrates coil C1 having a boundary element positioned within an angular range between DegB1e (45° from the previous explanation), and the boundary between pole M1 and pole M2 (90°, as shown in FIG. 5(A)). In this state, a current is supplied to the coil C1 to produce a magnetic field ($\phi c$) within the corresponding core T1. The magnetic field ($\phi c$) thus produced extends in a direction away from the center of rotation of the rotor towards the pole M1. Simultaneously, a magnetic field ($\phi m$) is produced within the core T1 by the poles M1 and M2. The direction of the magnetic field ($\phi m$) produced by the poles M1 and M2 is inverse to the direction of the magnetic field ($\phi c$) produced by the electric current. The magnetic flux density generated by the current induced magnetic field ($\phi c$) around the coil C1 is reduced by the magnetic flux density of the magnetic field ($\phi m$) generated by the permanent magnets. Therefore, in the following descriptions, this angular range is called the "reduced density area."

FIG. 5(B) illustrates the coil C1 positioned within an angular range from the change in polarity of the poles M1 to M2 (90° as shown in FIG. 5(B)), to a position where the supply of current for coil C1 is terminated at DegB2s (105° from the 0° reference). In this range, a current is supplied to the coil C1 to continue to produce a magnetic field ($\phi c$) within the corresponding core T1. The magnetic field ($\phi c$) thus produced, as explained previously, extends in a direction away from the center of rotation of the rotor towards the pole M2. Similar to the situation described in FIG. 5(A), a magnetic field ($\phi m$) is also produced within the core T1 by the poles M1 and M2. However, in this case, the direction of the magnetic field ($\phi m$) produced by the poles is the same as the direction of the magnetic field ($\phi c$) produced by the supplied current. Therefore, the magnetic flux density around the coil C1 is increased by an amount equal to the magnetic flux density of the magnetic field ($\phi m$) produced by the permanent magnets. The magnetic flux density around the coil C1 is approximately equal to an amount produced by the total magnetic field (φm+φc). In the following description, this part of the angular range is called an "increased density area."

FIG. 6 illustrates an example of a counter electromotive voltage that is superimposed onto a power source voltage from a power source E. The counter electromotive voltage is generated when the known DC motor described with reference to FIGS. 4(A)–4(B) and FIGS. 5(A)–5(B) has been started. As shown by this example, the change in the counter electromotive voltage per unit angle of rotation of the rotor ($\Delta Vz/\Delta \phi z$) increases significantly when the supply of current to each coil has been interrupted, i.e., when the boundary element between two adjacent commutator segments is within the range defined by the brushes B1–B4. In case of the DC motor shown in FIGS. 4(A)–4(B) and FIGS. 5(A)–5(B), the supply of current to any of the individual coils is interrupted at intervals of 30°. The counter electromotive voltage shown in FIG. 6 therefore also appears at a 30° cyclic period.

As will be seen from FIG. 6, the rate of change of the counter electromotive voltage per unit angle of rotation of the rotor ($\Delta Vz/\Delta \phi z$) increases when the supply of current to the coils is interrupted. If the rate of change of the counter electromotive voltage increases, a relatively high possibility of undesirable discharge exists between the brushes and the commutator segments, causing excessive wear of the brushes.

In order to teach a relatively low cost method to lessen the reduction of the overall magnetic density due to the interaction between the permanent magnets and the coil, Japanese Laid-Open Utility Model Publication No. 57-197779 proposes a magnetic field assembly using a reduced density portion of the pole having a smaller thickness than the main pole part.

Further, Japanese Laid-Open Patent Publication No. 57-59465 teaches a DC motor in which a high magnetic permeability material is combined with a combination of a permanent magnet having a good property against the reduction of magnetic density and a permanent magnet having a large magnetic flux in order to provide a property similar to a series wound DC motor.

However, a recent search produced no prior art that specifically teaches countermeasures against the increase in the magnetic flux density. Therefore, it is not considered easily possible to reduce or minimize the magnitude of the change of the counter electromotive voltage per unit angle of rotation of the rotor ($\Delta Vz/\Delta \phi z$). As a result, potential discharges between brushes and commutator segments may have not been prevented, and excessive wear of the brushes may have not been reduced.

SUMMARY OF TH INVENTION

It is accordingly an object of the present invention to teach improved techniques for reducing or minimizing abrupt change in a counter electromotive voltage in order to reduce or minimize wear of brushes.

According to one aspect of the present teachings, DC motors are taught that include a stator and a rotor. The stator has poles arranged around a circumferential direction of the stator. The rotor has cores that define slots therebetween. Coils are wound around the cores through the slots. Brushes serve to repeatedly start and interrupt the supply of current to the coils via respective commutator segments of the rotor in order to cause the rotor to rotate. Within each period of current supply to the coils, the polarity of the surface of the permanent magnets directly opposing the coils alternates from N to S or S to N. Each pole includes a reduced density area and an increased density area with respect to magnetic flux density. The reduced density area extends along an angular range from a first position where the supply of current to the coils is initiated to a second position where the boundary is formed between two poles. The boundary position defines the general point where the polarity of each adjacent pole, on the surface directly opposing the rotor, alternates from N to S or S to N. The increased density area extends along an angular range from the second position to a third position where the supply of current to the coils is interrupted. The magnetic flux density produced around a coil by the magnetic force of the poles, when a coil is positioned within the angular range of the increased density area, is smaller than the magnetic flux density produced around a coil by the magnetic force of the poles when a coil is positioned within the angular range of the reduced density area.

With this arrangement, it is possible to reduce the change in the magnetic flux density that is produced around a coil by the magnetic force of the poles when the supply of current to the coil is stopped while the coil is within the increased density area. Therefore, the amount of current supplied to each coil before the interruption of the current can be lowered, so that the change in the counter electromotive voltage per unit angle of rotation can be reduced or minimized when the supply of the current is interrupted. As a result, potential discharges between the brushes and the commutator segments can be reduced or minimized and it is therefore possible to reduce excessive wear of the brushes.

In another aspect of the present teachings, at least a part of the increased density area is configured so as to reduce the magnetic flux density. Alternatively or additionally, at least a part of the reduced density area is configured to increase the magnetic flux density. The general result is an overall reduction in the difference of the magnetic flux density between the increased density area and the reduced density area.

In an additional aspect of the present teachings, each pole comprises a first and second permanent magnet respectively defining the increased density area and the reduced density area. The magnetic force of the first permanent magnet, defining the increased density area, is less than the magnetic force of the second permanent magnet defining the reduced density area.

Therefore, reduction of the change in magnetic flux density (produced around a coil by the magnetic force of the poles when the supply of current to the coil is stopped while the coil is within the increased density area) can be realized by a relatively simple construction.

In a further aspect of the present teachings, each pole comprises a permanent magnet that has a first portion, defining the increased density area, and a second portion defining the reduced density area. The magnetic force of the first portion is smaller than the magnetic force of the second portion. For an example, the first and second portions may be made of different materials. Alternatively, the first and second portions may be magnetized to different magnetizing strengths.

Also with this arrangement, many of the same effects regarding magnetic flux density can be realized by using a simple construction.

In a still further aspect of the present teachings, each pole comprises a permanent magnet that has a first portion defining the increased density area and a second portion defining the reduced density area. A gap is defined between the permanent magnet and the end of the individual cores of the rotor. The gap defined by at least a part of the first portion is larger than the gap defined by the second portion. For example, forming a recess in the first portion may increase the gap.

With this arrangement as in the previous aspects, use of a relatively simple construction produces many of the same effects regarding magnetic flux density.

BRIEF DESCRIPTION OF THE DRAWINGS

Additional objects, features, and advantages, of the present invention will be readily understood after reading the following detailed description together with the claims and the accompanying drawings, in which:

DETAILED DESCRIPTION OF THE INVENTION

Figure 1:
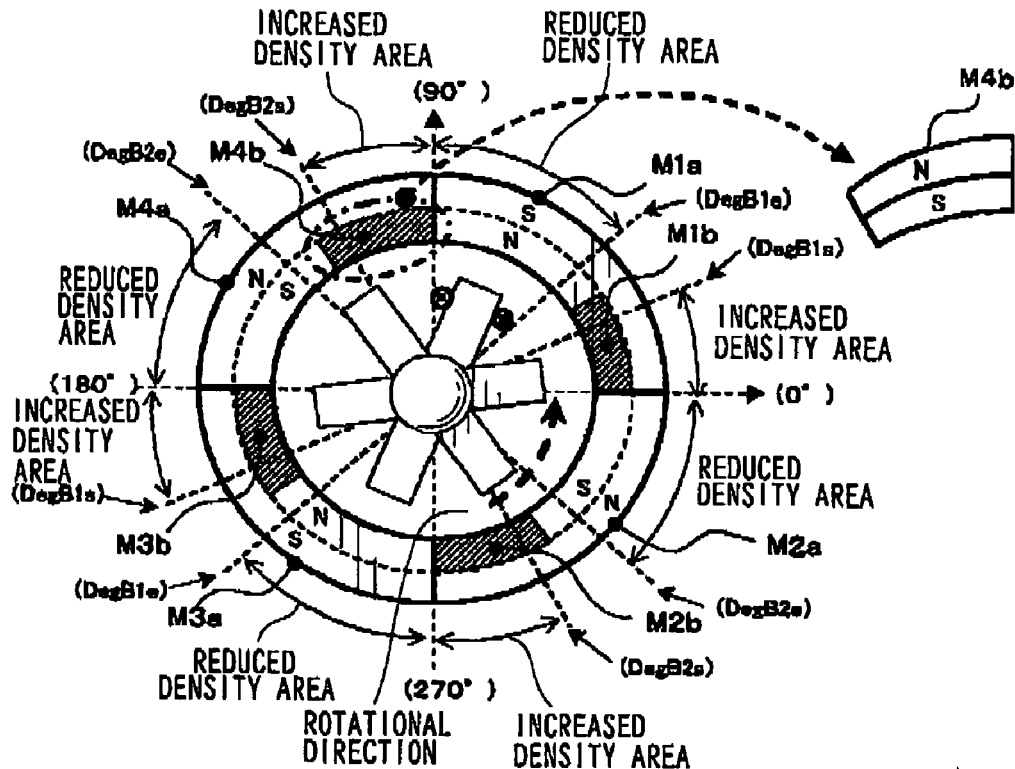
FIGS. 1(A) and 1(B) are schematic views of a first and second representative DC motor.
Figure 1:
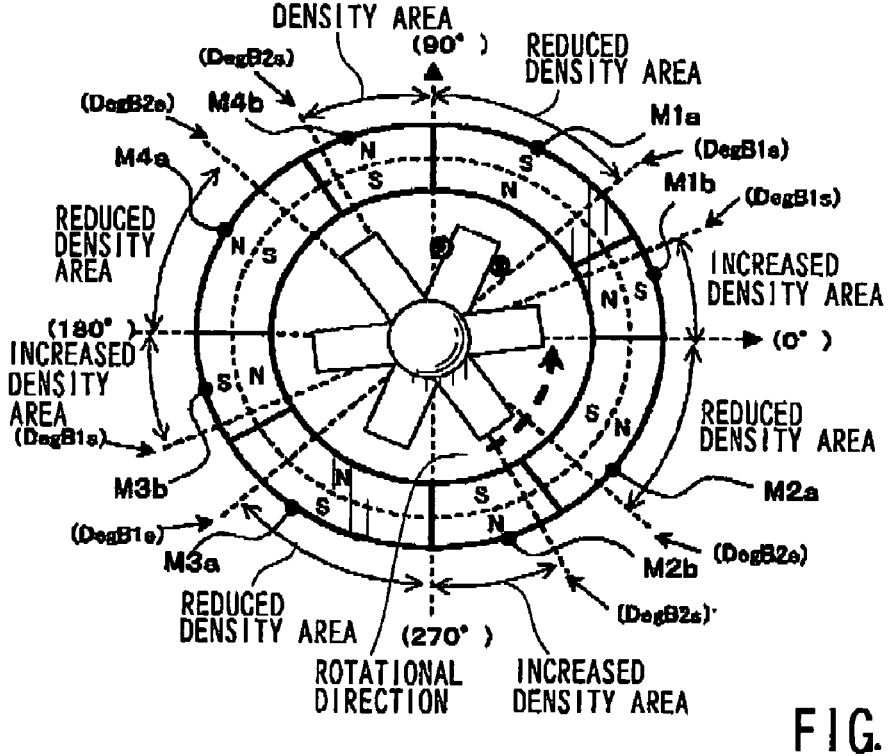

Each of the additional features and teachings disclosed above and below may be utilized separately or in conjunction with other features and teachings to provide improved DC motors, and improved methods of manufacturing and using such DC motors. Representative examples of the present invention, which utilize many of these additional features and teachings both separately and in conjunction with each other, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention, Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

A first representative embodiment will now be described with reference to FIGS. 1(A) and 1(B), which schematically show a first representative DC motor that is configured as a four-pole and six-slot DC brushed motor. The basic construction of the first representative embodiment is the same as the known DC motor shown in FIGS. 4(A) & 4(B) and 5(A) & 5(B). Therefore, elements that are similar to or identical with the known DC motor are labeled with the same reference numerals and an explanation of these elements may not be repeated.

The first representative DC motor has four poles M1, M2, M3, and M4, each including at least two permanent magnets that have different levels of magnetic strength or forces. The permanent magnets are configured such that the magnetic force of at least a part of each increased density area is smaller than the magnetic force of each reduced density area. Because the poles M1 to M4 have essentially the same construction, an explanation will be made to only the pole M4 and an explanation of the poles M1 to M3 will be omitted.

Referring to FIGS. 1(A) and 1(B), the pole M4 includes at least two permanent magnets M4$a$ and M4$b$. The permanent magnets M4$a$ and M4$b$ have S-poles on the side surface directly opposing the rotor. The magnetic force produced by the permanent magnet M4$a$ is applied in the reduced density area and the magnetic force produced by the permanent magnet M4$b$ is applied in the increased density area.

In general, in order to design a DC motor, the amount of magnetic flux produced by the poles when no current is supplied to the coil is calculated. Then, in order to provide maximum efficiency, the cross sectional area of the magnetic channels are determined such that the magnetic flux density produced at the cores of the rotor becomes substantially equal to the saturated magnetic flux density. However, according to this design when the coils are positioned within the decreased density areas, the magnetic flux produced by the poles may serve to reduce the magnetic flux produced by the coils. The magnetic flux density within the cores may then become less than the saturated magnetic flux density. In addition, when the coils are positioned within the increased density areas the magnetic flux produced by the poles may serve to increase the magnetic flux produced by the coils. The magnetic flux density within the cores may then become greater than the saturated magnetic flux density. Here, because there is magnetic flux that is transmitted through the air, the magnetic flux may still increase after reaching the saturated magnetic flux density even in little.

According to the first representative embodiment, in order to reduce the magnetic flux density that may be produced around the respective coils when the supply of current to the coils, positioned at the increased density areas, has been interrupted, the magnetic force of the permanent magnet M4$b$ is chosen to be smaller than the magnetic force of the permanent magnet M4$a$. This can be easily realized because the permanent magnets M4$a$ and M4$b$ are formed separately. In order to reduce the magnetic flux density when the supply of the current to the coils has been interrupted, the permanent magnet M4$b$ preferably extends beyond the boundary position (DegB2$s$ position) of the increased density area in the rotational direction of the rotor, i.e., the counterclockwise direction.

The two permanent magnets M4$a$ and M4$b$ may be assembled to each other by fitting the permanent magnet M4$b$ into a recess formed in a part of the permanent magnet M4$a$ at the increased density area as shown in FIG. 1(A). Alternatively, the permanent magnets M4$a$ and M4$b$ may have are shaped configurations and are arranged in series in the rotational direction as shown in FIG. 1(B).

In the arrangements shown in FIGS. 1(A) and 1(B), the permanent magnet M4$a$, having a smaller magnetic force than M4$b$, is arranged to begin at a point between the starting position of the increased density area to a position just beyond the point where the supply of current is interrupted, and extend in a counterclockwise direction until the starting point of the subsequent increased density area. Alternatively, the permanent magnet M4b may extend over at least part of a region within the increased density area, potentially starting at a point where the increased density area begins and extending counterclockwise until ending at a point where either the supply of current is interrupted or to a point just beyond the point where the supply of current is interrupted.

In addition to the reduction of the magnetic flux density produced around the coils within the increased density areas, the magnetic flux density produced around the coils within the reduced density areas may be increased. In this case, a permanent magnet having a relatively high magnetic force may be disposed within at least a part of the reduced density area.

Figure 3:
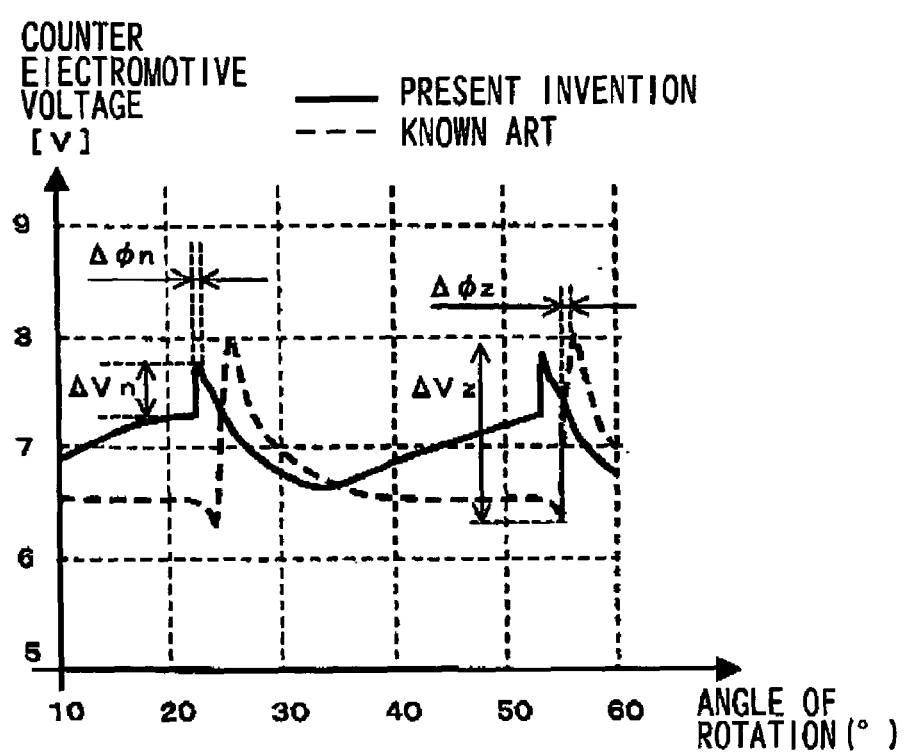
FIG. 3 is a graph illustrating a characteristic counter electromotive voltage (v) of a DC motor according to the present invention that is superimposed upon a dotted line representing the characteristic counter electromotive voltage of the known DC motor, both in relation to the angle (°) of rotation of a rotor.
Figure 4:
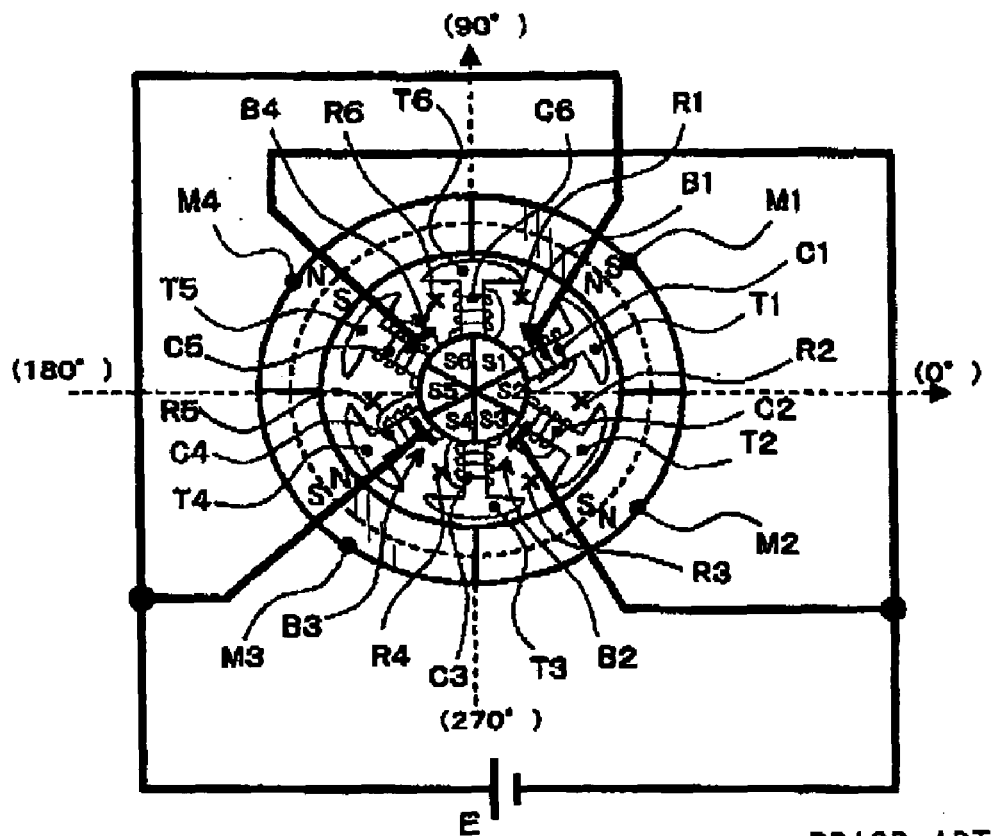
FIGS. 4(A) and 4(B) are schematic views of the known DC motor.
Figure 4:
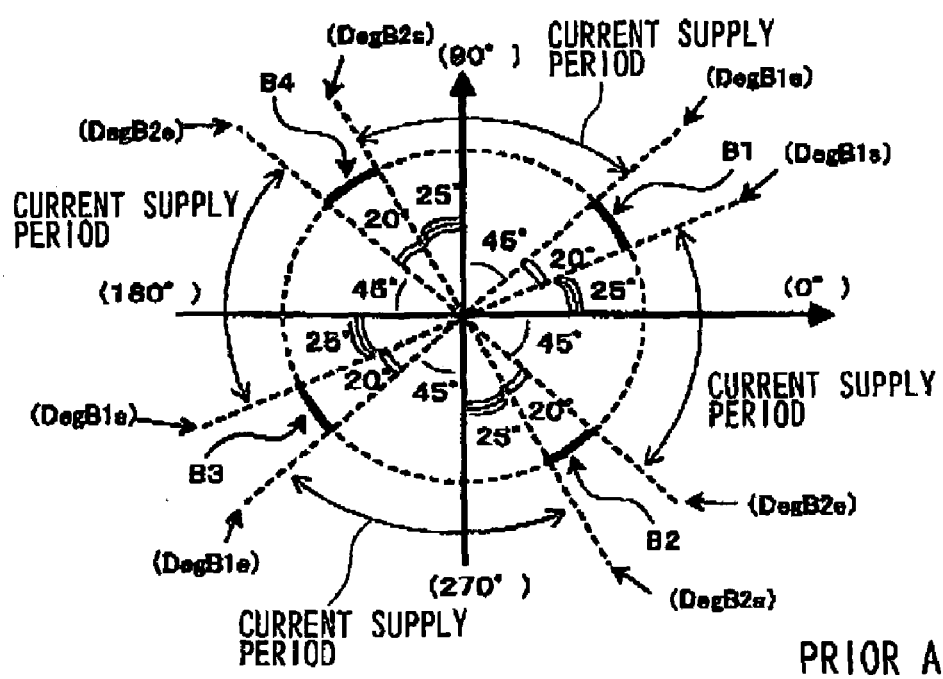
Figure 5:
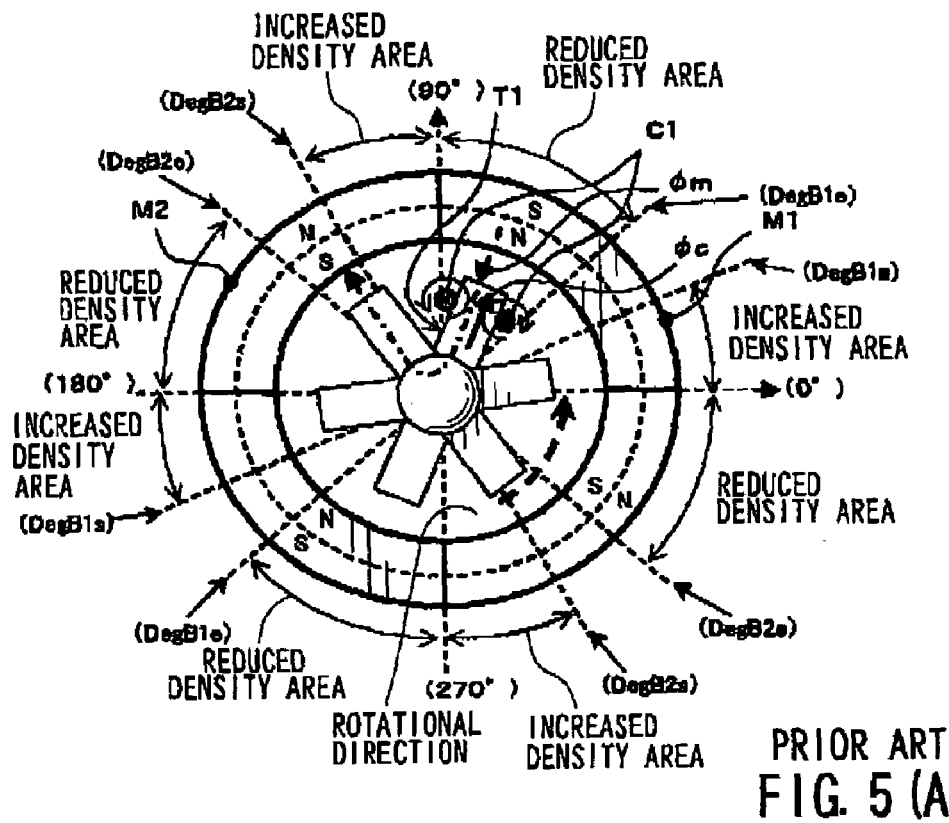
FIGS. 5(A) and 5(B) are views illustrating a magnetic flux density around each coil when a current is supplied during one representative cyclic period.
Figure 5:
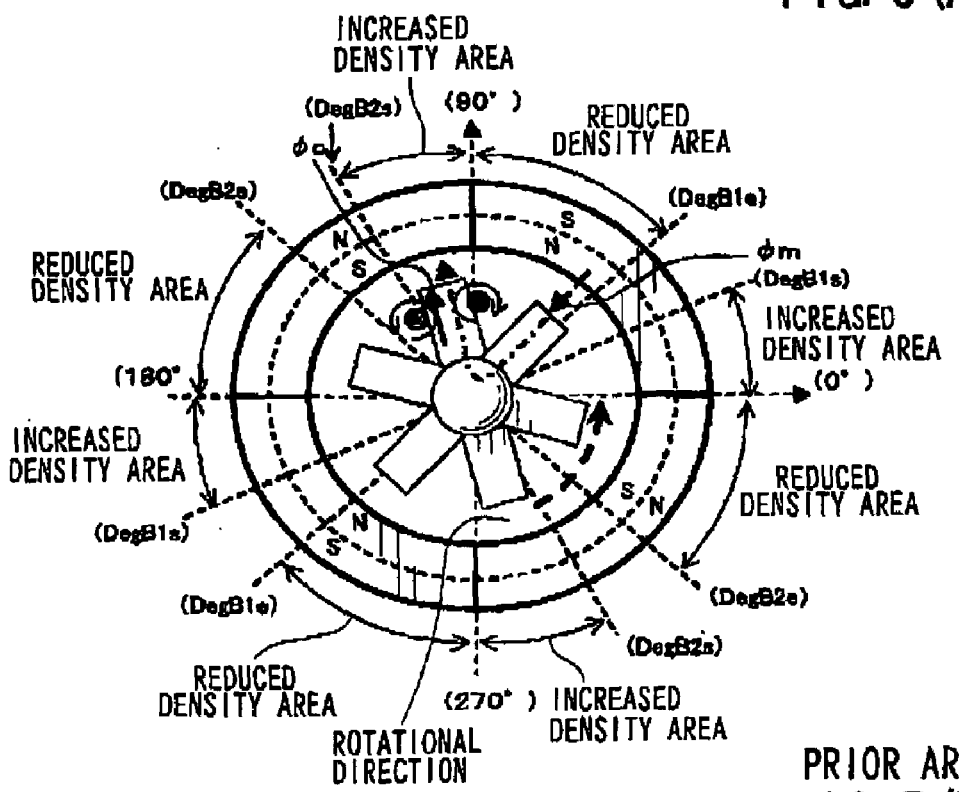
Figure 6:
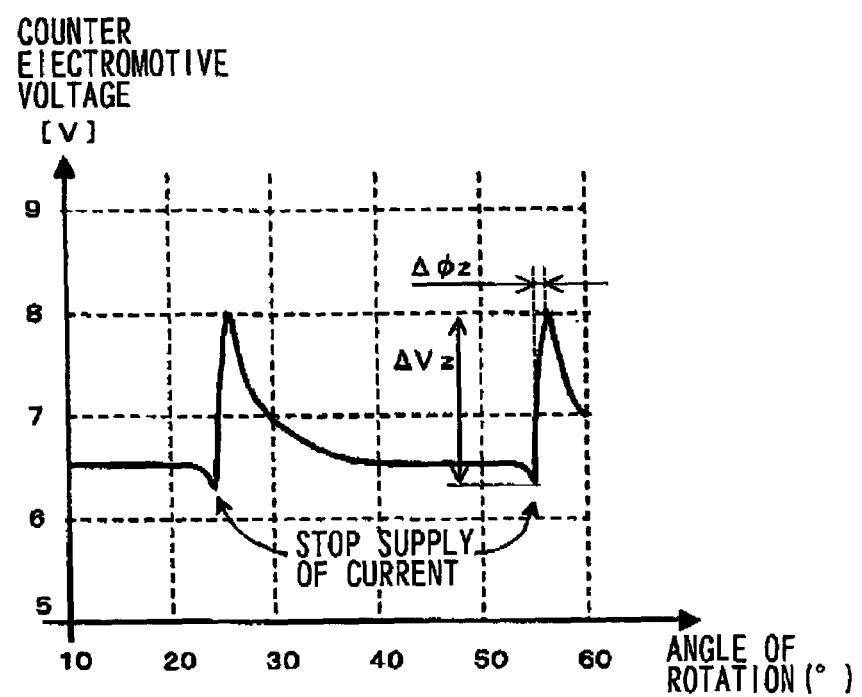
FIG. 6 is a graph illustrating a characteristic counter electromotive voltage (V) in relation to an angle (°) of rotation of a rotor for the known DC motor.

A characteristic line of the counter electromotive voltage (V) that is imposed upon the power source voltage, of the first representative DC motor, is shown in FIG. 3 in relation to the rotational angle (°) of the rotor.

As shown FIG. 3, the magnetic flux density produced around the coils by the magnetic forces of the poles when the supply of current to the coils is interrupted (within the increased density areas) can be reduced by the first representative DC motor using a relatively simple construction. Therefore, the change of the counter electromotive voltage per unit angle of rotation of the rotor ($\Delta Vn/\Delta \phi n$) can be reduced or minimized in comparison with the change in the counter electromotive voltage of the known DC motor ($\Delta Vz/\Delta \phi z$) (shown by the dotted line in FIG. 3). As a result, the counter electromotive voltage that is produced when the supply of current to the coils is interrupted can be reduced or minimized so that potential discharge between the brushes and the commutator segments can subsequently be reduced or minimized. The result is that excessive wear of the brushes can be reduced.

The counter electromotive voltage produced at the coils as described above is a voltage resultant from the combination of the counter electromotive voltage due to the change in the magnetic forces of the poles caused as the rotor rotates, and the counter electromotive voltage due to a change in the current flowing across the coils. Therefore, the counter electromotive voltage may change in proportion to change in over time of the magnetic flux that mainly flows through the cores.

In the known DC motors, the magnetic flux that flows through the cores exceeds the saturated magnetic flux density or exceeds a magnetic flux density nearly equal to the saturated density. Therefore, the change per unit time of the magnetic flux density is small and the counter electromotive voltage produced due to changes in the magnetic forces of the poles is also very small. As a result, a large current may flow across the coils before interruption of the supply of current to the coils.

Next, with respect to the change of the counter electromotive voltage caused when the supply of current is interrupted, the change of the magnetic forces of the poles is very small because the interruption of the supply of current occurs over a very short time. Therefore, the counter electromotive voltage is produced mainly by the reduction of the coil current, also occurring over a very short time. In the known DC motors, a large current flows across the coils before the interruption of supply of current. Therefore, the counter electromotive voltage may have a relatively large value in order to cause such a large change in the coil current.

In contrast, according to the first representative embodiment, the magnetic forces of the poles in the increased density areas are set to be of low strength. Therefore, before the interruption of the current, the magnetic flux is allowed to change by a relatively large amount to increase the counter electromotive voltage, so that the current flowing across the coils may be reduced, In addition, because the current flowing across the coils is low before the interruption of the supply of current, it is possible to also reduce the magnitude change of the counter electromotive voltage that may be produced by the reduction of the current when the current is interrupted. Therefore, potential discharges can be effectively reduced or minimized, so that the resistance of brushes against excessive wear can be improved.

Second Representative Embodiment

A second representative embodiment is a modification of the first representative embodiment, in which each pole includes at least two permanent magnets. A second representative DC motor differs from the first representative DC motor in that the magnetic force in the increased density area of each pole is set to be of relatively low strength. Therefore, the second representative embodiment will be described with reference to the same drawings as in the first representative embodiment, in particular FIG. 1(A). Because the poles M1 to M4 of the second representative DC motor are essentially identical, only the pole M4 will be explained as a representative example and an explanation of the poles M1 to M3 will be omitted. Further, the explanation of the pole M4 of the second representative DC motor will be made only for the features different from the representative pole M4 of the first representative DC motor.

In the second representative DC motor, the pole M4 is formed by the permanent magnets M4a and M4b in the same manner as the first representative DC motor. However, the magnetic force of the permanent magnet M4b is less than the magnetic force of the permanent magnet M4a.

This may be realized by magnetizing a magnetic material such that the magnetization of a portion corresponding to the increased density area is weaker than the magnetization of a portion corresponding to the reduced density area. Otherwise, different materials having different magnetic qualities can be respectively used for a part corresponding to the increased density area and a part corresponding to the reduced density area.

Further, in order to reduce the magnetic flux density when the supply of current to the coils is interrupted, the permanent magnet M4b, having a smaller magnetic force than permanent magnet M4a, preferably extends by a slight distance counterclockwise beyond the boundary position (DegB2s) of the increased density area, in the rotational direction of the rotor. Alternatively, the permanent magnet M4b may also extend within at least a part of the increased density area, for example extending from a position just short of the current interrupting position to the current interrupting position.

Further, in addition to the reduction of the magnetic flux density produced around the coils within the increased density areas, the magnetic flux density produced around the coils within the reduced density areas may be increased. In such a case, each pole is configured to produce a large magnetic force within at least a part of the corresponding reduced density area. In order to provide such a large magnetic force, the magnetization may be increased or the material selected for a portion of the pole may be chosen to have a relatively large magnetic force.

Also with this second representative embodiment, the magnetic flux density produced around the coils by the magnet forces of the poles when the supply of current to the coils is interrupted (within the increased density areas) can be reduced. The resultant change of the counter electromotive voltage per unit angle of rotation of the rotor ($\Delta Vn/\Delta \phi n$) can be reduced or minimized in comparison to the change in the counter electromotive voltage of the known DC motor ($\Delta Vz/\Delta \phi z$) (shown as the dotted line in FIG. 3). As a result, the counter electromotive voltage that is produced when the supply of current to the coils is interrupted can be reduced or minimized, so that the potential discharge between the brushes and the commutator segments can be reduced or minimized and excessive wear of the brushes can be reduced.

Third Representative Embodiment

Figure 2:
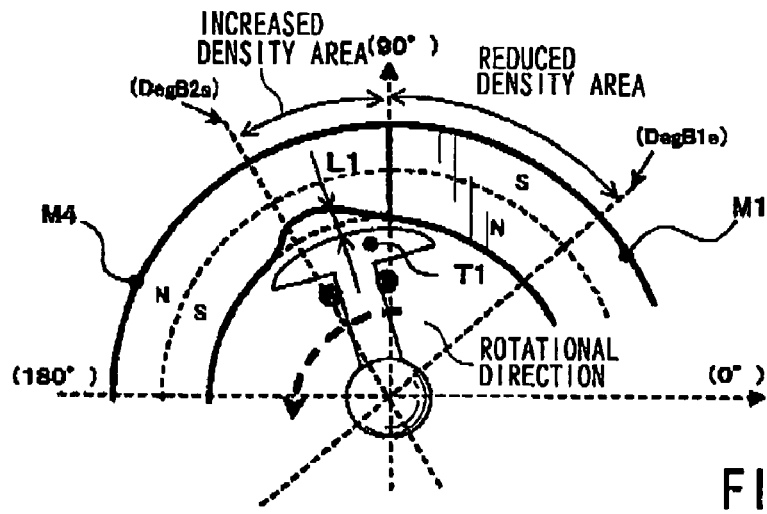
FIGS. 2(A), 2(B) and 2(C) are schematic views of a third representative DC motor.
Figure 2:
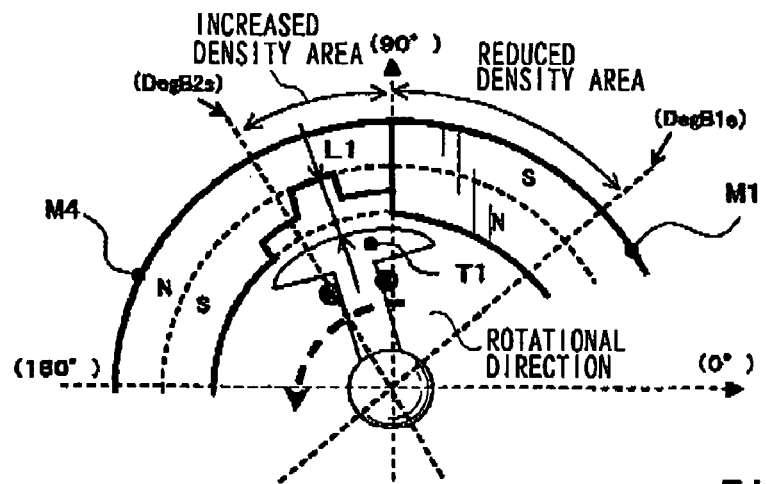
Figure 2:
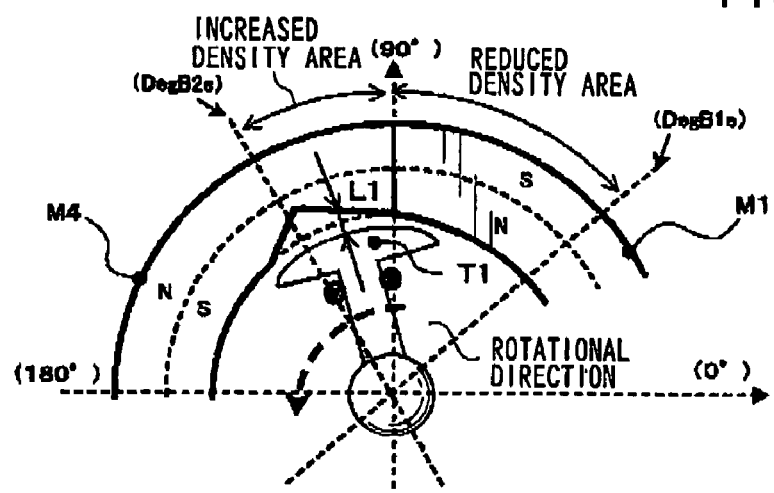

A third representative embodiment is another modification of the first representative embodiment. Thus, a third representative DC motor differs from the first representative DC motor in that the magnetic flux density produced around the coils is reduced by increasing a gap (L1) between each core and at least a part of the corresponding increased density area (i.e., the corresponding pole) as shown in FIG. 2(A). The third representative DC motor can reduce the magnetic flux density produced around the coils without requiring the changing of the magnitude magnetic forces of the increased density areas. Also, the third representative DC motor can be made with only a single magnet for each of the poles M1 to M4. Because the poles M1 to M4 of the third representative DC motor are identical, only the representative pole M4 will be explained in detail and an explanation of the poles M1 to M3 may be omitted. Further, the explanation of the pole M4 of the third representative DC motor will be made for only those features which are different from the representative pole M4 of the first representative DC motor.

Referring to FIG. 2(A), the pole M4 is formed by a single permanent magnet and is configured such that the gap (L1) between the pole M4 and the core T1, within the corresponding increased density area, increases when the supply of current to the corresponding coil is interrupted.

As shown in FIG. 2(A), a part of the pole M4, around the DegB2s position where the supply of current to the coil is interrupted, is configured as a gently curved recess. With this configuration, the magnetic flux density produced around the coil can be reduced at the point when the supply of current to the coil is interrupted.

In an alternative embodiment shown in FIG. 2(B), a part of the pole M4, around the DegB2s position where the supply of current to the coil is interrupted, is configured as a stepped recess. In another alternative embodiment shown in FIG. 2(C), a part of the pole M4, around the DegB2s position where the supply of current to the coil is interrupted, is configured as a substantially triangular recess. Such a portion of the pole M4 may be configured as any kind of geometric recess or combination of geometric recesses other than those shown in FIGS. 2(A) to 2(C).

Preferably, the recess extends by a small angle beyond the boundary position (DegB2s position) of the increased density area in the counterclockwise rotational direction, e.g. the motor rotational direction, in order to reduce the magnetic flux density when the supply of current to the coil is interrupted.

In the third representative embodiment shown in FIG. 2(A) and the alternative embodiments shown in FIGS. 2(B) and 2(C), the recess of the pole M4 extends from the starting position of the increased density area (i.e., the 90° position defining the boundary between the poles M1 and M4) to a position just beyond the DegB2s position by a small angle in the counterclockwise direction, where the supply of current to the coil is interrupted. However, the recess may extend within at least a part of the increased density area. Thus the recess may extend over a range from a position short of the DegB2s position to the DegB2s position.

In addition, the third representative embodiment shown in FIG. 2(A) and the alternative embodiments shown in FIGS. 2(B) and 2(C) may also be configured to increase the magnetic flux density that is produced around the coils within the reduced density areas in addition to reducing the magnetic flux density produced around the coils within the increased density areas. For example, this may be realized by providing a projection on at least a part of each pole within the reduced density area in order to reduce the gap (L1) between the pole and the cores.

Also with the third representative embodiment and the third representative alternative embodiments, the magnetic flux density produced around the coils by the magnetic forces of the poles when the supply of current to the coils is interrupted (within the increased density areas) can be reduced by using a relatively simple construction. Thus, the change of the counter electromotive voltage per unit angle of rotation of the rotor ($\Delta Vn/\Delta \phi n$) can be reduced or minimized in comparison with the change in the counter electromotive voltage of the known DC motor ($\Delta Vz/\Delta \phi z$) as shown in FIG. 3. As a result, the magnitude of the counter electromotive voltage that is produced when the supply of current to the coils is interrupted can be reduced or minimized, so that the potential discharge between the brushes and the commutator segments can be reduced or minimized resulting in the reduction of excessive wear of the brushes.

The above representative embodiments may be modified in various ways without departing from the sprit of the present invention.

For example, although the above representative embodiments have been described in connection with four-pole and six-slot DC motors, the present invention also may be applied to DC motors having different number of poles and slots. For example, the number of slots (i.e., the number of coils) may be seven or more while the number of the poles is four. Otherwise, the number of the slots may be eight or more while the number of the poles is six. Otherwise, the number of slots may be ten or more while the number of the poles is eight. Additional combinations of poles and slots known but not listed are assumed to be within the scope of the invention.

In addition, although the above representative embodiments have been described in connection with DC motors of a delta-connection type, the present invention also may be applied to DC motors having coils of a star-connection type.

Further, the numeric values noted in the above representative embodiments should be considered to be only examples and are not intended to limit the scope of the invention.

Furthermore, although the above representative embodiments have been described in connection DC motors having the same number of brushes as the number of poles, the number of the brushes may be smaller than the number of the poles. For example, if the number of the coils is an even number, the number of the brushes may be reduced by short-circuiting between two commutator segments that are displaced from each other by an angle of 180°.

What is claimed is:

1. A DC motor comprising:
   a stator having a plurality of poles arranged in a circumferential direction of the stator;

a rotor including a plurality of cores, a plurality of coils wound around respective cores, and a plurality of commutator segments electrically connected to respective coils; and a plurality of brushes arranged and constructed to repeatedly start and interrupt a supply of current to the coils via respective commutator segments in order to rotate the rotor, wherein:

the poles have surfaces opposing to the rotor and the surfaces of two circumferentially adjoining poles have different polarities from each other, so that the polarities of the pole surfaces opposing to each coil alternate during each period of supply of the current to the coil;

each pole defines a reduced density area and an increased density area with respect to a magnetic flux density, the reduced density area extends along an angular range from a first position, where the supply of current to the coils is initiated, to a second position, where the polarities of the pole surfaces opposing to each coil alternate;

the increased density area extends along an angular range from the second position to a third position where the supply of the current to the coils is interrupted; and the magnetic flux density produced around each coil by a magnetic force of each pole when each coil is positioned within at least a part of the angular range of the increased density area is smaller than the magnetic flux density produced around each coil by a magnetic force of each pole when each coil is positioned within at least a part of the angular range of the reduced density area.

2. A DC motor as in claim 1, wherein at least a part of the increased density area is configured in shape to reduce the magnetic flux density.

3. A DC motor as in claim 1 wherein at least a part of the reduced density area is configured in shaped to increase the magnetic flux density.

4. A DC motor as in claim 2, wherein:

each pole comprises at least:

a first permanent magnet extending substantially through the increased density area;

a second permanent magnet extending substantially through the reduced density area;

wherein a magnetic force of the first permanent magnet is smaller than a magnetic force of the second permanent magnet.

5. A DC motor as in claim 4, wherein the first and second permanent magnets are formed integrally with each other.

6. A DC motor as in claim 4, wherein the first and second magnets are made of different materials from each other.

7. A DC motor as in claim 4, wherein the first and second magnets are magnetized to different magnetizing strengths.

8. A DC motor as in claim 2, further comprising:

a first gap between the poles and the cores of the rotor corresponding to at least a part of the increased density area; and a second gap between the poles and the cores of the rotor corresponding to at least a part of the reduced density area;

wherein, the first gap is larger than the second gap.

9. A DC motor comprising:

a stator having a plurality of poles comprising;

a surface directly opposing a rotor;

a polarity of an N-pole and a S-pole;

wherein the poles are uniformly arranged about a circumferential direction of the stator; and wherein the surface directly opposing the rotor of one pole will have an N-pole and the adjacent pole surface directly opposing the rotor will have an S-pole, alternating the polarity as a rotor rotates; and the rotor including a plurality of coils, wherein each coil comprises;

a core;

a wire with a first end and a second end;

a plurality of commutator segments;

a plurality of brushes arranged and constructed to repeatedly start and interrupt a supply of current to the coils via respective commutator segments; and wherein within each period of supply of the current to the coil the coil rotates through two adjacent poles; and wherein each pole includes a reduced density area and an increased density area with respect to a magnetic flux density; and wherein the reduced density area is defined as extending along an angular range from;

a first position where the supply of current to the coils is initiated; to a second position between two adjacent poles where the polarity of each adjacent pole on the surface directly opposing the rotor is alternated;

wherein the increased density area is defined as extending along an angular range from;

the second position; to a third position where the supply of the current to the coils is interrupted; and the magnetic flux density produced around each coil by a magnetic force of each pole when each coil is positioned within at least part of the angular range of the increased density area is smaller than the magnetic flux density produced around each coil by a magnetic force of each pole when each coil is positioned within at least part of the angular range of the reduced density area.

10. A DC motor as in claim 9, wherein at least a part of the increased density area is configured in shape so as to reduce the magnetic flux density produced around the coil.

11. A DC motor as in claim 10, wherein at least a part of the reduced density area is configured in shape so as to increase the magnetic flux density produced around the coil.

12. A DC motor as in claim 11, further comprising;

a first gap between the poles and the cores of the rotor corresponding to at least part of the increased density area; and a second gap between the poles and the cores of the rotor corresponding to at least part of the reduced density area;

wherein, the first gap is larger than the second gap.

13. A DC motor as in claim 9, wherein;

each pole comprises at least;

a first permanent magnet extending substantially through the increased density area, and a second permanent magnet extending substantially through the reduced density area;

wherein a magnetic force of the first permanent magnet is smaller than a magnetic force of the second permanent magnet.

14. A DC motor as in claim 13, wherein the first and second magnets are made of different materials from each other.

15. A DC motor as in claim 13, wherein the first and second magnets are magnetized to different magnetizing strengths.

16. A DC motor as in claim 9 wherein;
each pole comprises at least;
 a first permanent magnet extending through the increased density area and into the reduced density area, and
 a second permanent magnet extending substantially through the remainder of the reduced density area;
wherein a magnetic force of the first permanent magnet is smaller than a magnetic force of the second permanent magnet.

17. A DC motor as in claim 16, wherein the first and second magnets are made of different materials from each other.

18. A DC motor as in claim 16, wherein the first and second magnets are magnetized to different magnetizing strengths.

19. A DC motor as in claim 9 wherein;
each pole comprises at least;
 a first permanent magnet extending through a portion of the increased density area, and
 a second permanent magnet extending through the remainder of the increased density area and substantially through the reduced density area;
wherein a magnetic force of the first permanent magnet is smaller than a magnetic force of the second permanent magnet.

20. A DC motor as in claim 19, wherein the first and second magnets are made of different materials from each other.

21. A DC motor as in claim 19, wherein the first and second magnets are magnetized to different magnetizing strengths.

* * * * *